Figure 1:
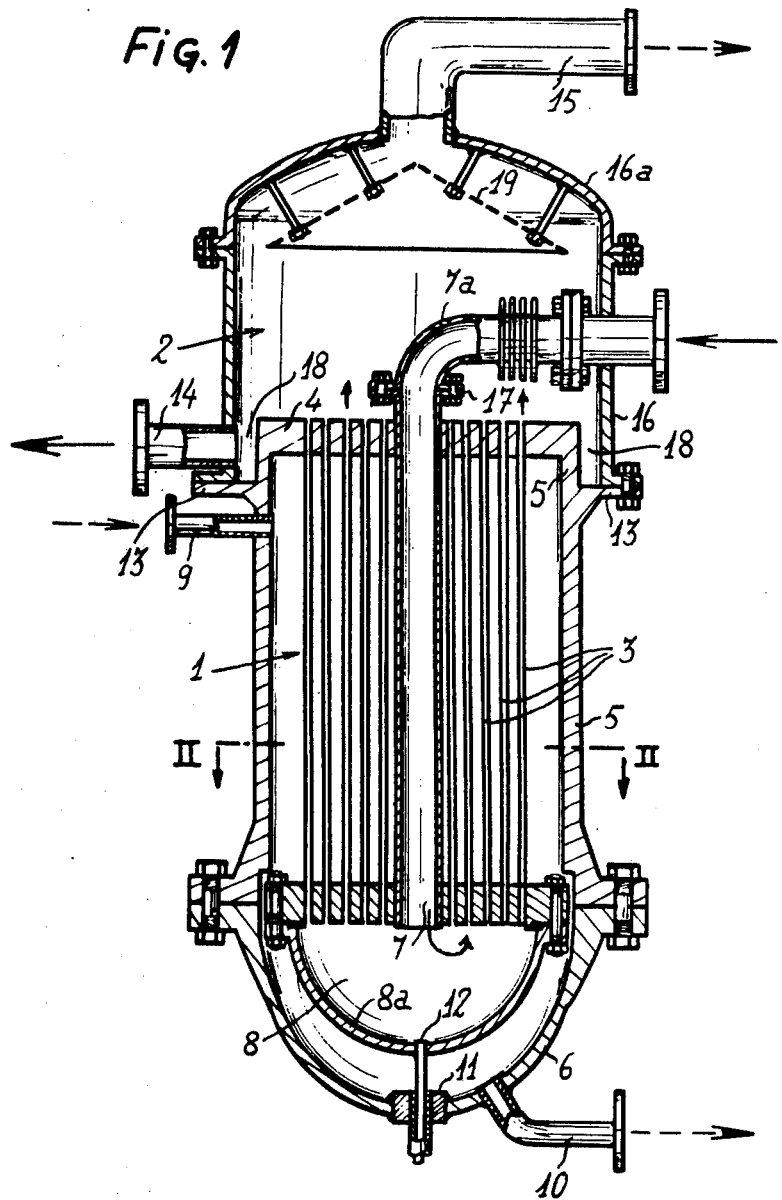

United States Patent [19]

Cros et al.

[11] 4,174,273

[45] Nov. 13, 1979

[54] SEPARATING EXCHANGERS

[75] Inventors: Pierre Cros, Paris; Jean-Pierre Desorbay, Dennemont; Jean-Jacques Refoubelet, Paris, all of France

[73] Assignees: Spie-Batignolles; Societe Generale de Techniques et d'Etudes, both of Puteaux, France

[21] Appl. No.: 873,837

[22] Filed: Jan. 31, 1978

Related U.S. Application Data

[62] Division of Ser. No. 717,286, Aug. 24, 1976, abandoned.

[30] Foreign Application Priority Data

Sep. 9, 1975 [FR] France .............................. 75 27570

[51] Int. Cl.² .......................... B01D 3/14; C10G 7/00
[52] U.S. Cl. .................................. 208/364; 196/106; 202/177; 203/71
[58] Field of Search ................ 159/27 D, 27 R, 26 R; 196/110, 106; 202/237, 235, 177; 208/347, 350, 352, 354, 357, 361, 363, 364, 366; 203/21, 39, 71

[56] References Cited

U.S. PATENT DOCUMENTS

| | | | |
|---|---|---|---|
| 2,895,909 | 7/1959 | Strickland | 208/364 |
| 2,897,146 | 7/1959 | Waddill | 208/364 |
| 2,900,312 | 8/1959 | Gilmore | 208/354 |
| 3,242,970 | 3/1966 | Schmole | 159/27 D |

*Primary Examiner*—Hiram H. Bernstein
*Attorney, Agent, or Firm*—Young & Thompson

[57] ABSTRACT

A method for heating crude oil to be processed in a petrochemical installation, comprises successive heat exchangers disposed in series, each heat exchanger using pressurized steam as the heating fluid. Each exchanger has a lower exchange chamber, a liquid product supply line and a tube bundle, the steam transferring heat to liquid product flowing through the tube bundle. Each heat exchanger comprises an upper separation chamber disposed above the lower exchange chamber, the separation chamber having a gas phase outlet and a liquid phase outlet, the liquid phase outlet being disposed lower than the level at which the tube bundle extends into the separation chamber. Successive heat exchangers are connected together by a pipe communicating between the liquid phase outlet of the upper separation chamber of one of the heat exchangers and the liquid product supply line of the next heat exchanger. The gas phase outlets of the successive heat exchangers are connected directly and independently from each other to the petrochemical installation, the liquid phase outlet of the last heat exchanger being connected to that installation. The steam for heating the heat exchangers is at a successively higher pressure, and hence a successively higher temperature, in the successive exchangers.

2 Claims, 6 Drawing Figures

SEPARATING EXCHANGERS

This invention relates to a separating exchanger using a heating fluid inter alia in the form of pressurized vapour and of use more particularly for heating the liquid products processed in petrochemical plant, more particularly in oil refineries. The invention also relates to various industrial uses of such heat exchanger, inter alia for heating crude oil before its introduction into a distillation column at atmospheric pressure, for reboiling the bottoms of crude oil distillation columns and for gasoline stabilization.

In crude oil treatment plant, the products to be distilled are of course normally heated in furnaces using hydrocarbons as fuel. Unfortunately, the efficiency of such furnaces rarely exceeds 75%. Another of their disadvantages is that accurate control of the heating temperature of the product being treated is difficult. Another disadvantage is the risk of the product catching fire immediately it starts the leak.

Also known are heat exchangers having a chamber in which the heating fluid transfers its heat to the liquid product flowing through a tube bundle. The tube bundle undergoes considerable dimensional variations due to variations in the temperature gradient between the entry and exit of the exchange chamber. U-tubes which cannot be cleaned internally, expansion joints or metal bellows with their disadvantage of high cost and fragility, are used conventionally to prevent rupturing.

Also, there is no provision in these known exchangers for effectively separating the liquid phases from the vapour phases of the processed product, with the result that there is a considerable pressure drop in such exchangers.

Also known is a heat exchanger comprising a chamber in which the heating fluid transfers its heat to the liquid product flowing through a tube bundle, one end thereof being free relatively to the walls of the exchange chamber just referred to the tube bundle extending around the liquid product supply line, the end thereof communicating with the free end of the tubes. Such a heat exchanger can withstand the effects of relatively considerable temperature variations. However, it has been found that the latter kind of heat exchanger produces relatively substantial pressure drops when used to heat a fluid tending to evaporate. More particularly, it is difficult to connect such a heat exchanger in series with one or more similar exchangers in order to improve the heat transfer conditions between the products to be processed and the heating fluid.

It is an object of this invention to obviate the disadvantages of the constructions mentioned by enabling the provision of a heat exchanger which can withstand considerable temperature and pressure variations and which has a very reduced pressure drop and can therefore readily be used in series with other similar heat exchangers.

According to the present invention, the heat exchanger of the kind hereinbefore specified also comprises a chamber in which separation of the liquid and gas phases occurs and which is disposed above the exchange chamber, the separation chamber having a gas phase outlet and a liquid phase outlet, the liquid phase outlet being disposed lower than the level at which the tube bundle extends into the separation chamber.

A heat exchanger according to the present invention provides the following technical advantages:

It causes a very slight pressure drop in the flow of heating fluid and liquid products as compared with the pressure drop in conventional ovens and known exchangers.

There is no heat expansion problem since one end of the tube bundle is free relatively to the exchange chamber.

The phase separation chamber is so constructed that a low pressure drop and a high transfer factor can be provided with simultaneous separation of the liquid and gas phases.

It can withstand a wide range of pressure variations.

In the event of leakage, there would be no direct contact between the hot product and the flame, with a consequent reduction in fire risk.

Advantageously, the phase separation chamber is releasably secured to a collar at the top of the exchange chamber, the annular gap between the collar, the top part of the exchange chamber and the bottom part of the separation chamber receiving the liquid phase which has been separated from the gas phase. The liquid phase can be collected satisfactorily from the annular gap. Also, since the same experiences only the pressure of the gas phase, the connection between the separation chamber and the exchange chamber experiences only the stress caused by the latter pressure; consequently, the heat exchanger can withstand a wide range of pressure and temperature variations.

Preferably, the heat exchanger hereinbefore described is connected to at least one second identical heat exchanger, a pipe being connected between the liquid-phase outlet of the separation chamber of the first exchanger and the liquid supply line of the adjacent exchanger, the consecutive exchangers having independent gas phase outlets. Interconnecting consecutive exchangers by connecting the liquid phase outlet of one exchanger and the liquid supply entry of the next exchanger while the vapour phases remain independent is a means of improving heat exchange performances.

Preferably, the heat exchanger according to the invention is used to heat crude oil before the introduction thereof into a distillation column at atmospheric pressure.

In such a case, the heat exchanger preferably uses as heating fluid steam at a pressure of at least approximately 160 bars. The steam heats the crude oil to a temperature of approximately 300° C. before the oil is introduced into the column. The temperature can very readily be maintained at an optimum value simply by adjusting the steam pressure and the rates of flow of the vapour and of the crude oil to be distilled.

Figure 2:
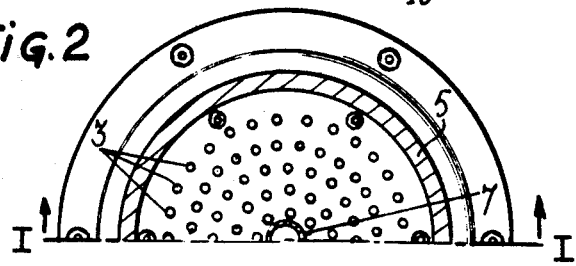
Figure 3:
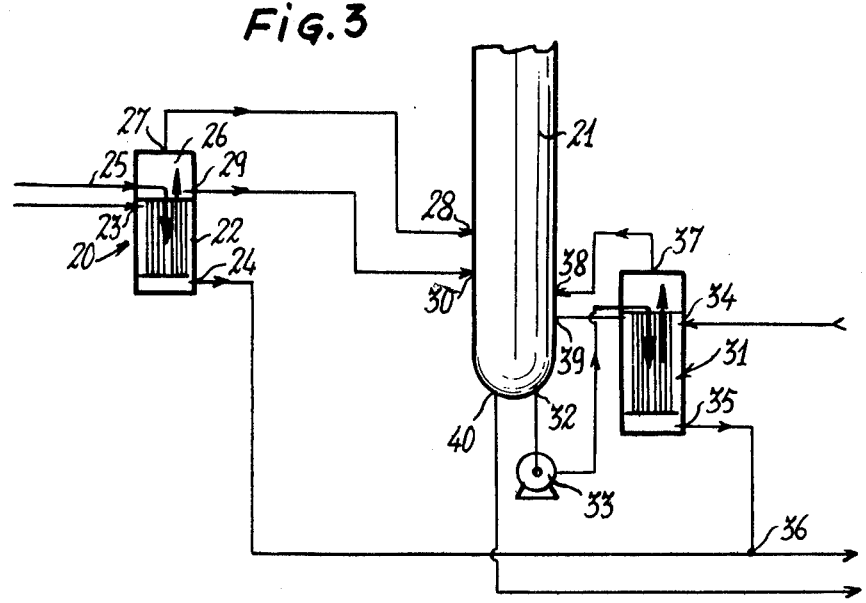
Figure 4:
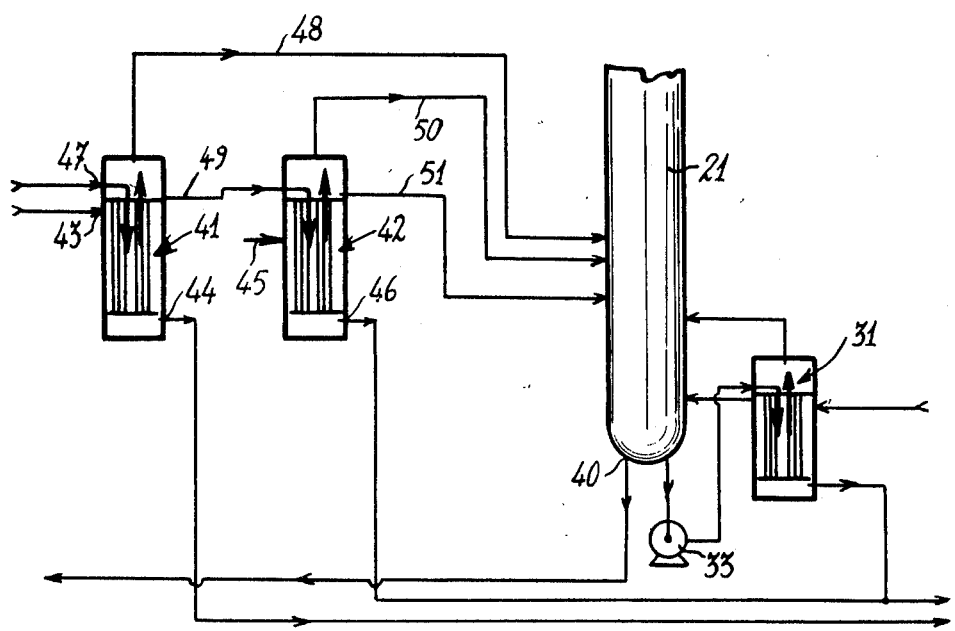
Figure 5:
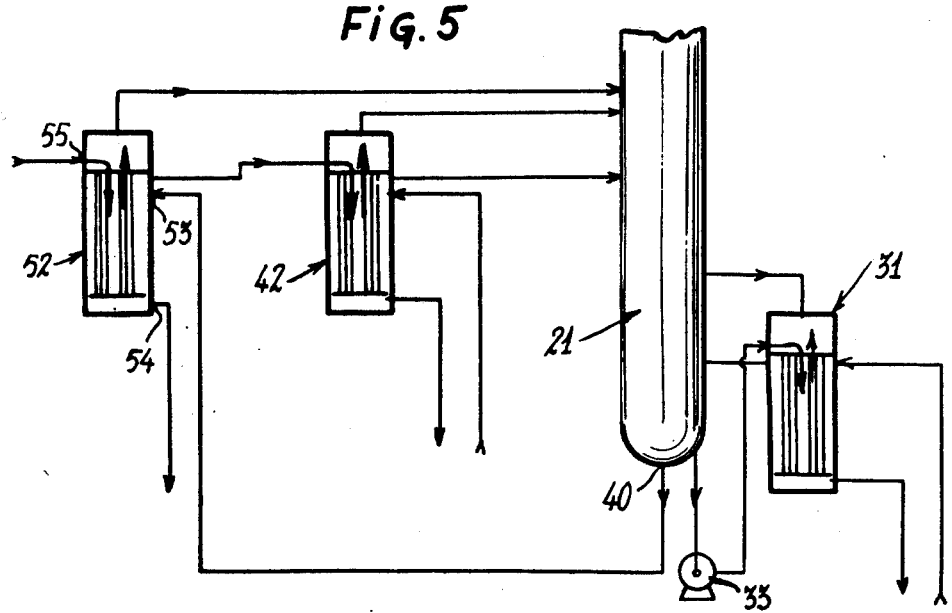
Figure 6:
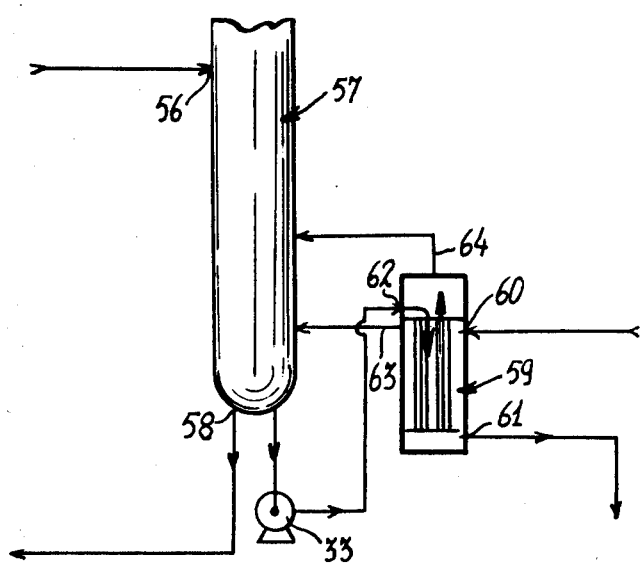

For a better understanding of the present invention and to show how the same may be carried into effect, reference will now be made, by way of example, to the accompanying drawings, in which FIG. 1 shows a longitudinal sectional view of a heat exchanger according to the invention, FIG. 2 shows a half-section on the line II—II of FIG. 1, FIG. 3 shows a diagrammatic view of how the invention is of use for heating crude oil before its introduction into a distillation column and for reboiling the column bottoms, FIG. 4 shows a diagrammatic view, similar to FIG. 3, in which two serially connected heat exchangers precede the distillation column, FIG. 5 shows a variant of FIG. 4, and FIG. 6 shows a diagrammatic view of how a heat exchanger can be used for gasoline stabilization.

In the embodiment shown in FIGS. 1 and 2, the heat exchanger according to the invention comprises two chambers disposed one above another—a heat exchange chamber 1 at the bottom, and a top chamber 2 for separating the liquid phase from the gas phase of the liquid product being treated.

The bottom, and in this case cylindrical, heat exchanger chamber 1 has a vertical tube bundle 3 which extends into separation chamber 2. In this construction, the tube bundle 3 is distributed substantially uniformly around the vertical axis of the exchange chamber 1.

As will be apparent, the top end of the tube bundle 3 is rigidly secured to a wall 4 bounding the exchange chamber 1 from the separation chamber 2, whereas the bottom end of the tube bundle 3 is free relatively to side wall 5 and base 6 of the separation chamber 2.

The exchange chamber 1 also comprises a liquid product supply line 7 which extends along the vertical axis of the exchange chamber 1 and which communicates at its bottom end with tube bundle 3. In the construction shown, communication between the line 7 and the tube bundle 3 is by way of hemispherical chamber 8 independent of the exchange chamber 1, the base 6 thereof also being hemispherical and being arranged substantially concentrically of the chamber 8. The exchange chamber 1 also has at the top a heating fluid inlet line 9 and an outlet line 10 connected to the base 6.

As is also apparent from FIG. 1, the hemispherical base 6 and hemispherical bowl-like member 8a which bounds the chamber 8 are removable, so that the exchange chamber 1 can be cleaned or repaired as and when necessary. Also, the hemispherical member 6 and the bowl 8a are formed with drain orifices 11 and 12 which are normally closed and which communicate with one another.

The top separation chamber 2 is releasably secured to a collar, flange or the like 13 at the top of the exchange chamber 1. The top separation chamber 2 has at the bottom an outlet line 14 for the liquid phase of the product being treated; at the top, the separation chamber 2 has an outlet line 15 for the gas phase of the product being treated. A pipe elbow 7a extends through side wall 16 of the separation chamber 2 and is connected at a connection 17 to the product supply line 7.

As will also be apparent, the liquid outlet line 14 is disposed below the level at which the tube bundle 3 extends into the separation chamber 2, while the collar or flange 13, the top part of exchange chamber side wall 5 and the bottom part of separation chamber side wall 16 bound an annular gap 18 for collecting the liquid phase of the treated product.

Also, near the vapour phase outlet 15, the separation chamber 2 has a conical perforate metal sheet 19 which flares downwardly in the separation chamber 2 and which is secured to cover 16a thereof.

The heat exchanger just described operates as follows:

A liquid product to be treated, for example crude oil, is introduced into the line 7 by way of the elbow 7a, whereafter the product to be treated is distributed uniformly by way of the hemispherical chamber 8 to the various tubes of the tube bundle 3 extending around the line 7.

The heating fluid, for example very high pressure steam, enters the exchange chamber 1 through the inlet line 9 and transfers its heat to the liquid product for treatment which is flowing through tube bundle 3 towards the separation chamber 2. The steam leaves the exchange chamber 1 through outlet line 10. After heat exchange with the steam, the liquid product to be treated enters the separation chamber 2 in a partially evaporated condition. The vapour phase leaves the separation chamber 2 through the outlet line 15 and the liquid phase is collected in the annular gap 18 at a level below the level at which the tube bundle joins the separation chamber 2. The liquid phase, which has been completely separated from the gas phase, leaves separation chamber 2 through the outlet line 14. The conical plate 19 prevents droplets of liquid being carried towards exit 15 by the gas phase.

It has been found that the heat exchanger according to the invention can provide the following main advantages:

It has a high heat transfer coefficient, coupled with a very reduced pressure drop at its exit;

Part of the reason for the high transfer coefficient is the effective separation between the liquid and vapour phases in the separation chamber 2;

The exchanger according to the invention also solves heat expansion problems arising from the temperature gradients of the heating fluid and of the liquid product to be treated, since the tube bundle 3 is free to expand lengthwise;

The exchanger can also withstand a wide range of pressure variations, more particularly because the exchange chamber 1 communicates with the separation chamber 2 by way of the annular gap 18;

The exchanger according to the invention is also easy to clean since the separation chamber 2 and the bottom of the exchange chamber 1 are removable.

Also, the separation chamber 2, being secured releasably by means of the flange 13, can very readily be replaced by a different chamber suitable for the gas phase pressure required in the separation chamber and for the volume of liquid to be collected in gap 18. For instance, when a fluid causing a relatively high vapour pressure in the separation chamber 2 is used, a separation chamber designed to withstand the high pressure can be used instead of the existing chamber 2. Also, the fluid used leads to a considerable collection of liquid in the gap 18, the particular chamber 2 used should have a bottom diameter such that the gap 18 can receive the entire body of liquid which has been separated from the vapour phase.

The heat exchanger according to the invention can therefore operate with a wide range of fluids and at pressures varying between wide limits, without any need to modify the exchange chamber 1—a great advantage in the light of the relatively high cost of constructing the exchanger chamber 1 as compared with the cost of the separation chamber 2.

Referring now to FIGS. 3 to 6, a description will be given of some preferred used of the heat exchanger according to the invention.

Referring to FIG. 3, heat exchanger 20 is used to heat crude oil before its introduction into a distillation column 21 operating at atmospheric pressure. The heat exchanger 20 replaces the heating oven of conventional plants.

In this example, the heat exchanger 20 uses steam at a very high pressure of approximately 160 bars. The steam enters exchange chamber 22 at 23 and condensate leaves chamber 22 via outlet 24. Crude oil which has previously been heated to approximately 250° C. by a conventional heating facility (not shown) is introduced into exchange chamber 22 at 25. After heat exchange with the high-pressure steam, the vapour and liquid phases of the crude oil separate from one another in separation chamber 26. The vapour phase leaves chamber 26 at 27 and enters the distillation column at 28 and with a temperature of approximately 300° C. The liquid phase leaves separation chamber 26 at 29 and enters column 21 at 30.

It has been found that, in this particular case, the use of the heat exchamber 20 exchanger of a furnace, appreciably improves the energy sufficiency of the plant. The temperature of the crude oil at column entry 28 can be adjusted very readily be adjusting the rates of flow of the high-pressure steam and of the crude oil. Such a heat exchanger can be used with advantage in the crude oil treatment plant described in U.S. Pat. No. 3,968,030.

Heat exchanger 31 shown in FIG. 3 is used to reboil the residue present at the bottom of distillation column 21. The residue is sampled at 32 and introduced into exchanger 31 by pump 33. As in the previous case, exchanger 31 works on steam at a very high pressure of approximately 160 bars, the steam entering exchanger 31 and 34 and leaving it as condensate at 35. At 36, the condensate mixes with the condensate coming from exchanger 20.

The vapour phase of the residue treated in exchanger 31 leaves the same at 37 and enters column 21 at 38, at a temperature of approximately 320° C. The liquid phase of the treated residue enters column 21 at 39. After reboiling in exchanger 31, the residue issues from the bottom of column 21 at 40.

The heat exchanger 31 can be used with advantage instead of the conventional facilities for reboiling distillation column bottoms by steam injection. The great advantage of using the exchanger 31 for this purpose is that the distillates of column 21 are anhydrous and therefore require no special dehydration treatment.

The diagram shown in FIG. 4 differs from that of FIG. 3 in that two serially connected exchangers 41 and 42 are provided before the column 21. In this example, heat exchanger 41 operates on steam at a pressure of approximately 45 bars; however, the pressure can be from approximately 40 to 70 bars. The steam enters exchanger 41 at 43 and leaves it at 44.

The heat exchanger 42 immediately preceding column 21 uses, as in the previous case, steam at a very high pressure of approximately 160 bars. The very-high-pressure steam enters exchanger 42 and 45 and leaves as condensate at 46. In this example, crude oil preheated to approximately 200° C. enters the first exchanger 41 at 47. The vapour phase goes directly to column 21 through a line 48 which is independent of the vapour outlet line of the other exchanger. However, the liquid phase goes to the second exchanger 42 through line 49, and is converted therein into a vapour phase and another liquid phase which both go to column 21 through lines 50 and 51, respectively.

In the embodiment under consideration, the products leave the first exchanger 41 at a temperature of approximately 250° C. and they leave the second exchanger 42 at a temperature of approximately 300° C.

Interconnecting two exchangers in series is useful for a number of reasons:

Crude oil can be introduced into the first exchanger 41 at a temperature below the normal value, since the temperature can be raised to the required value in the first exchanger by heat exchange with medium-pressure steam.

Since the second exchanger 42 is supplied solely with the liquid phase, there is an appreciable reduction in the pressure drops normally found in crude oil heating furnaces. In the embodiment considered, such pressure drop is reduced to approximately 3 bars, as compared with the figure of 10 bars which is normal for conventional plants.

Of course, more than two exchangers can be associated in series if necessary without any significant increase in the pressure drop.

In FIG. 5, the difference from FIG. 4 is that the first exchanger 52 uses as heating fluid not medium-pressure steam but the oil residue which leaves the bottom of column 21 at 40 at a temperature of approximately 320° C. The residue enters exchanger 52 at 53 and leaves at 54 at a temperature of approximately 260° C. In this embodiment, the crude oil enters exchanger 52 at 55 and at a temperature of 210° C., the liquid phase leaving at a temperature of approximately 250° C. as in the case of the exchanger 41 of FIG. 4.

The advantages of such a scheme are the same as those associated with FIG. 4.

FIG. 6 relates to the use of a heat exchanger according to the invention for heating gasolines in a stabilizing column.

Unstabilized gasoline is introduced into stabilization column 57 at 56 and leaves at 58 after it has been heated in a heat exchanger 59. The heat exchanger 59 uses steam at a medium pressure of from approximately 40 to 70 bars. The steam enters the heat exchanger 59 at 60 and leaves it at 61.

The gasoline sampled at the bottom of the column at a temperature of approximately 200° C. is introduced into exchanger 59 at 62 and leaves in liquid phase at 63 at approximately 215° C. and in vapour phase at 64.

The stabilization operation is identical to the reboiling of the oil residue present at the bottom of an atmospheric distillation column.

The advantage of using a heat exchanger according to the invention instead of a conventional boiler for gasoline stabilization is that the heat exchanger can provide stabilization with medium-pressure steam which is regularly available in a oil refinery and cheap, since it is usually steam which has already performed mechanical or electrical work.

The invention is not of course limited to the exemplary uses just described. For instance, the heat exchanger according to the invention can be used in any heat transfer operation requiring partial vaporization of the liquid product to be treated.

Of course, the heating fluid used must be compatible with the vaporization or distillation temperatures of the product to be treated. For instance, the medium-pressure steam (40 to 70 bars) can in all cases be replaced by a heating fluid heated to a comparable temperature.

We claim:

1. A method of heating crude oil before the introduction thereof into a distillation column at atmospheric pressure, which comprises the steps of:
   (a) passing the crude oil through successive heat exchangers disposed in series, each exchanger having a lower exchange chamber and an upper separation chamber
   (b) introducing in the exchange chamber of each heat exchanger steam at a pressure which increases from one heat exchanger to the other, said steam pressure reaching approximately 160 bars in the heat exchanger which precedes the crude oil distillation column, (c) separating the crude oil by heat exchange with said steam in the successive separation chambers into a vapor phase and a liquid phase, (d) withdrawing the vapor phase from each separation chamber and introducing said successive vapor phases separately and directly into the distillation column at different supply levels, the vapor phase of the first exchanger being introduced at a supply level higher than the supply level of any of the vapor phases separated in the other successive heat exchangers, (e) withdrawing the liquid phase from the bottom of each separation chamber and introducing said liquid phase in the lower exchange chamber of the following heat exchanger in order to convert said liquid phase into a vapor phase and a higher boiling liquid phase, (f) introducing into the distillation column, the liquid phase withdrawn from the heat exchanger which precedes the crude oil distillation column at a supply level disposed lower than the supply level of any of the vapor phases separated in the successive heat exchangers.

2. A method of heating crude oil according to claim 1, and comprising the step of introducing into the exchange chamber of the successive heat exchangers steam at a pressure which increases between 40 and 160 bars from the first heat exchanger to the last heat exchanger.

* * * * *